Nov. 4, 1969  R. O. ANDERSON  3,476,059
ELECTRICALLY HEATED ICE CREAM SCOOP
Filed Jan. 2, 1968
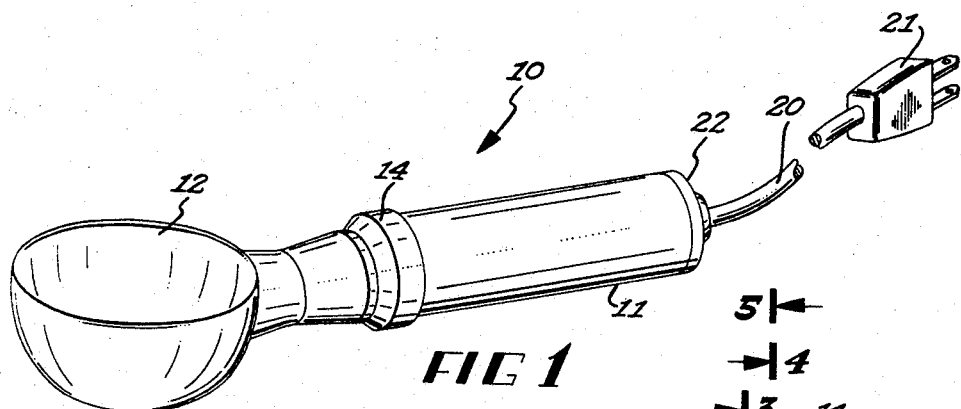
FIG 1
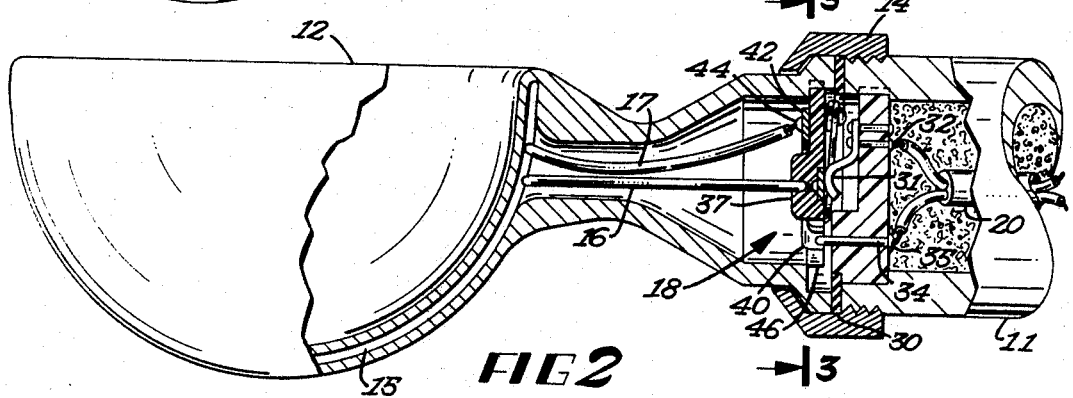
FIG 2
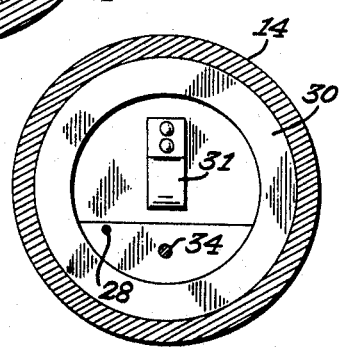
FIG 3
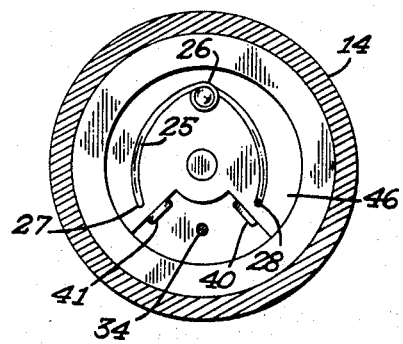
FIG 5
FIG 4
INVENTOR.
ROBERT O. ANDERSON
BY Meyers & Peterson
ATTORNEYS

United States Patent Office 3,476,059
Patented Nov. 4, 1969

3,476,059
ELECTRICALLY HEATED ICE CREAM SCOOP
Robert O. Anderson, Rte. 2, Paynesville, Minn. 56362
Filed Jan. 2, 1968, Ser. No. 703,823
Int. Cl. A47j *43/28;* H05b *3/42;* H01h *9/06*
U.S. Cl. 107—48                             4 Claims

ABSTRACT OF THE DISCLOSURE

An ice cream scoop having a gripping handle with a ladle member pivotally secured to one end of the handle, the ladle being adapted to rotate axially relative to the handle, and generally about the axis of the handle. Means are provided for accommodating the axial rotation of the ladle relative to the handle, and heating means are provided in thermally conducting relationship with the ladle for heating the ladle when the ladle is rotated axially from its normal position.

---

The present invention relates generally to an improved apparatus for dispensing congealed or frozen commodities from a bulk supply, such as ice cream or the like, and more particularly to such a scoop which is provided with heating means arranged in thermal conducting relationship with the ladle member of the scoop device.

In the past, heated ladles have been provided for scoops of this type, the arrangement being such that the operator will energize the heating means by closing a suitable switch as the unit is being used. Devices of this sort suffer from the inherent disadvantage of overheating when the operator fails to open the switch or otherwise disconnect the flow of power to the heating means when the scoop is not in use. Since these devices are normally used only intermittently or infrequently, continuous heating is therefore ordinarily unnecessary. While it is possible to provide a unit with a thermostatic control element, which will respond to maintaining a relatively constant temperature in the ladle portion, these thermostatic control elements are generally unreliable, and hence do not contribute to the longevity of the apparatus. In addition, it may be possible to employ modern battery power for such a device, hence energization of the heating means should reasonably be necessary only when called for in order to increase the life of the battery power if utilized.

In accordance with the present invention, means are provided for heating a ladle member of a scoop device adapted for use with congealed or frozen commodities, wherein the heating means is energized only while the apparatus is specifically in use. Therefore, thermostatic control means are not essential to proper use of the apparatus. In order to accomplish this mode of operation, the ladle member is pivotally secured to the gripping handle, and the heating means are energized only when a torsional stress is applied between the ladle and the gripping handle. In other words, when the scoop assembly or apparatus is at rest, the heating means are not energized, and only become energized when a predetermined stress is applied, as previously indicated, between the ladle and the gripping handle.

Therefore, it is an object of the present invention to provide an improved scoop apparatus for dispensing congealed or frozen commodities such as ice cream or the like, wherein heating means are provided for heating the portion of the scoop which is in contact with the congealed or frozen commodity only during those times that actual contact is made.

It is yet a further object of the present invention to provide an improved scoop apparatus for dispensing congealed or frozen commodities such as ice cream or the like wherein heating means are provided for the portion of the scoop which is in contact with the congealed or frozen commodity, and wherein means are provided for energizing these heating means only during the time that the scoop apparatus is in physical engagement with congealed or frozen commodities and is forcing its way through a body of the congealed or frozen commodity.

Other and further objects of the present invention will become apparent to those skilled in the art upon a study of the following specification, appended claims, and accompanying drawing wherein:

FIGURE 1 is a perspective view of a scoop device prepared in accordance with the present invention;

FIGURE 2 is a detail elevational view, partially in section, showing the ladle portion of the scoop apparatus together with the head portion of the gripping handle, FIGURE 2 being shown on a somewhat enlarged scale; and FIGURES 3, 4 and 5 are vertical sectional views taken along the lines and in the directions of the arrows 3—3, 4—4, and 5—5 respectively.

In accordance with the preferred modification of the present invention, the scoop dispenser apparatus generally designated 10 includes a gripping handle member 11, along with a ladle member 12. The ladle member 12 is pivotally secured to the gripping handle 11 by means of the slip ring assembly 14 coupled therebetween. As is indicated in the broken away portion of FIGURE 2, the ladle member 12 is provided with an electrically energized heating element 15, which derives its power from the rigid conductor member 16 and the flexible conductor 17. Switch menas generally designated 18 are provided at the point where the ladle 12 is coupled to the gripping member 11. Conductor means 20, appropriately insulated are provided from the point 18, to the conventional male plug member 21, the conductor means 20 preferably being arranged coaxially within the gripping handle member 11. Thus, it will be appreciated that the gripping handle 11 is normally a tubular cylindrical element having a cap 22 at the closed end thereof, the cap 22 being provided with a port for receiving the conductor assembly 20.

The ladle member 12 is arranged for limited pivotal rotation relative to the gripping handle member 11. As indicated, the ring member 14 permits this relative rotation between these members to occur. With specific reference to FIGURES 2 and 5, it will be observed that a resilient spring biasing member 25 is provided at the juncture point between the ladle member 12 and the gripping handle 11. This resilient spring member has a coil 26 disposed between a pair of clevis ends 27 and 28, respectively. The resilient biasing action is obtained when the clevis portion 28 is received within the gripping handle 11, such as in an appropriate port or bore formed therein, while the corresponding opposed clevis 27 is received within a similar port or bore in the ladle member 12. Thus, it is clear that the ladle member 12 is free to rotate relative to the gripping handle 11 within the confines of the ring 14. In order to enhance freedom of relative rotation, a low friction gasket or washer mechanism is interposed as at 30.

Turning now to the electrical coupling between the source of electrical power and the heating means 15, particular attention is directed to the condition responsive contact shown in FIGURES 2, 3 and 4. In this apparatus, one of the conductors from the line 20 is electrically coupled to the spring loaded electrical contact blade 31 by means of a suitable contact arrangement as at 32. The other conductor from the line 20 is coupled to the relatively rigid or stiff prong member 34 by means of a suitable electrical contact as at 35. The blade element 31 is arranged to engage the surface of the disc contact 37 which is disopsed coaxially with the gripping handle 11 and disposed at the face or end of the ladle member 12. Rubbing contact is therefore obtained between the blade 31 and the disc 37 whenever relative rotation occurs between the gripping handle 11 and the ladle member 12. The post or prong 34 is arranged to contact opposed arcuately spaced flange surfaces 40 and 41 of the arcuate contact member 42, member 42 being disposed coaxially with the gripping handle member 11 and disc 37. The face of the arcuate conductor member 42 is preferably soldered to one end of the conductor 17, such as at 44.

In operation, the operator will grasp the gripping handle 11 and being contacting the surface of the bulk congealed or frozen commodity with the edge portion of the ladle member 12. As pressure is applied by the operator, the resilient spring member 25 will flex, and permit relative rotation to occur between the ladle member 12 and the gripping handle 11. This relative rotation is confined by the flanges or ears which are arranged on the ring 14. As the pressure continues, the torsional stress between the ladle member 12 and the gripping handle 11 will ultimately bring the surface of one of the flanges 40 or 41 into contact with the rigid post 34. Upon this contact being made, a circuit path is then available through the heating means 15. Thus, the heating means are thereby energized and the surface of the ladle member 12 is heated. This heating, will of course, enhance the ability of the ladle member to traverse through the bulk of the congealed or frozen commodity. When the operator completes his scooping operation, the torsional stress is relieved, and the contact established between the post 34 and one of the flanged surfaces 40 or 41 is broken. The heating element 15 is then de-energized and the ladle member is permitted to cool.

It will be appreciated that the design of the ladle member 12 is conventional, depending of course, upon the requirements of the congealed or frozen commodity being treated therewith. In the case of a conventional ice cream scoop, it will be appreciated that the edge surfaces defining the rim of the ladle will be generally sharpened to assist in the cutting and dispensing operation. Furthermore, it will be appreciated that the amount of electrical energy applied to the scoop apparatus of the present invention will be only that amount of energy required during the actual cutting phase of the dispensing operation. Upon completion of the cutting phase, the liquid film between the inner surface of the ladle member and the surface of the commodity being dispensed will not increase in thickness, thus melting of the congealed or frozen commodity is held at a practical minimum.

In order to enhance the production capability of the apparatus, the circuitry utilized in arranging an electrical contact to the heating means 15 and including the disc 37 and the annular contact member 41, may be mounted on a separate insulator 46, such as is shown in FIGURE 3. This member 46 may be notched, as indicated, in order to receive the projecting key 47, formed integrally in the projecting portion of the ladle member 12 which is coupled to the gripping handle 11.

It will be further appreciated that the flanged members 40 and 41 will act in a dual capacity as a contact element, and also as a stop against further axial rotation between the ladle member 12 and the gripping handle 11. Added stress will be reflected in an enhanced electrical contact between the post 34 and the flanged elements 40 and 41.

It will be recognized that the heating means 15 is normally electrically insulated from the surface of the ladle member 12. In this connection, the heating means 15 may be a resistive heating element which has a sufficient power capacity to rapidly heat the ladle member to a temperature significantly above the melting tempearture of the congealed or frozen commodity. Normally, the ladle means will be prepared in two parts, an inner surface and an outer surface, the two surfaces being joined together by a suitable bond encapsulating the heating element therebetween. Naturally, appropriate precautions will be taken to electrically isolate the heating means from the surface of the ladle member.

It will be appreciated that the specific examples provided herein are given for purposes of illustration only, and there is accordingly no intension of limiting the scope of this invention to these specific examples alone. Therefore, those skilled in the art may depart from these specific examples without actually departing from the spirit and scope of the present invention.

I claim:

1. In combination with a scoop for dispensing congealed commodities, the scoop having a gripping handle with a ladle member pivotally secured to one end thereof and adapted for axial rotation relative to the axis of said handle;
    (a) mechanically coupling means for permitting predetermined pivotal axial rotation of said ladle member relative to said gripping handle between a first rest position and a second position arcuately and pivotally spaced from said first rest position,
    (b) resilient bias means for urging said ladle member toward said rest position and permitting axial rotation of said ladle relative to said handle when a torsional stress is applied between said ladle and said handle,
    (c) electric heating means in thermal conducting relationship with said ladle member for elevating the temperature of said ladle member,
    (d) conductor means for coupling a source of electrical energy to said electric heating means, and
    (e) switch means disposed along said conductor means and secured to said gripping handle and ladle respectively and having at least one contact pair associated with said handle means and said ladle means respectively, said contact pairs being adapted to engage responsive to the relative arcuate positions of said ladle and said gripping handle, the arrangement being such that said contacts are open when said ladle is in said rest position and closed when said ladle is in a position arcuately spaced from said rest position.

2. The scoop dispensing apparatus as defined in claim 1 being particularly characterized in that said heating means is insulatively embedded in the ladle member.

3. The scoop dispensing apparatus as defined in claim 1 being particularly characterized in that said resilient bias means comprise a spring member.

4. In combination with a scoop for dispensing congealed commodities, the scoop having a gripping handle with a ladle member pivotally secured to one end thereof and adapted for axial rotation relative to the axis of said handle;
    (a) mechanical coupling means for permitting predetermined pivotal axial rotation of said ladle member relative to said gripping handle between a first rest position and a second position arcuately and pivotally spaced from said first rest position,
    (b) resilient bias means for urging said ladle member toward said rest position and permitting axial rotation of said ladle relative to said handle when a torsional stress is applied between said ladle and said handle,
    (c) stop means secured to said gripping handle for limiting the extent of relative pivotal rotation between said ladle and said handle, (d) electric heating means in thermally conductive relationship with said ladle, and conductor means for coupling a source of electrical energy to said electric heating means, and (e) said electrical conductor means being coupled to said stop means and having contact elements mounted for relative rotation with said gripping handle and ladle respectively and arranged to be closed for completing an electrical circuit coupling a source of electrical energy to said heating means when said ladle is rotated away from said rest position, the arrangement being such that the contact elements associated with said stop means close to provide a circuit coupling a source of electrical power to said heating means when said ladle is rotated arcuately from its rest position and the said stop means are in substantial engagement with said ladle means.

References Cited

UNITED STATES PATENTS

| | | |
|---|---|---|
| 1,726,427 | 8/1929 | Eaton. |
| 1,726,428 | 8/1929 | Eaton. |
| 1,971,577 | 8/1934 | Parker _____ 107—48 |
| 2,256,770 | 9/1941 | Armstrong _____ 107—48 |
| 3,024,342 | 3/1962 | Birnbach. |

ANTHONY BARTIS, Primary Examiner

U.S. Cl. X.R.

200—157, 227; 219—240